United States Patent [19]

Schneider et al.

[11] Patent Number: 5,019,006
[45] Date of Patent: May 28, 1991

[54] AIRCRAFT ENGINE PROPELLER OVERSPEED PROTECTION TECHNICAL FIELD

[76] Inventors: Roy W. Schneider, 29 Gail Dr.; Christopher D. Sierra, 60 Pinney St., Both of Ellington, Conn. 06029

[21] Appl. No.: 484,744

[22] Filed: Feb. 26, 1990

[51] Int. Cl.$^5$ .............................................. B64C 11/40
[52] U.S. Cl. ........................................ 416/35; 416/36; 416/43; 416/44
[58] Field of Search ....................... 416/31, 35, 36, 43, 416/44, 61; 364/434, 435

[56] References Cited

U.S. PATENT DOCUMENTS

| | | | |
|---|---|---|---|
| 2,322,303 | 6/1943 | Martin | 416/36 |
| 2,499,376 | 3/1950 | Ferrill, Jr. | 364/435 X |
| 2,640,550 | 6/1953 | Knapp et al. | 416/35 |
| 2,667,228 | 1/1954 | Wood et al. | 416/36 X |
| 3,589,830 | 6/1971 | Morgren et al. | 416/35 X |
| 4,845,617 | 7/1989 | Kamenetz et al. | 364/551.01 X |

*Primary Examiner*—Edward K. Look
*Assistant Examiner*—James A. Larson

[57] ABSTRACT

An aircraft engine propeller autofeather system (4) has a feather solenoid (8) which is actuated by either a signal provided by an engine power loss detector (10) or a signal provided by an engine overspeed detector (12). The overspeed detector (12) detects excessive propeller speed by comparing the speed to a first predetermined value (21) or by comparing the speed rate of change to a second predetermined value (23) combined with comparing the speed to a third predetermined value (25).

5 Claims, 1 Drawing Sheet

AIRCRAFT ENGINE PROPELLER OVERSPEED PROTECTION TECHNICAL FIELD

DESCRIPTION

1. Technical Field

This invention relates to the field of aircraft engine propellers and more particularly to the field of overspeed protection for aircraft engine propellers.

2. Background Art

Aircraft engine propeller rotational speed is controlled by adjusting the pitch of the propeller blades. As the pitch of the blades decreases (i.e. the blades are urged more parallel to the plane of rotation of the propeller), the rotational speed of the propeller increases. Similarly, as the pitch of the blades increases, the rotational speed of the propeller decreases.

Aircraft engine propellers can be damaged by sustained operation at very high rotational speeds. Therefore, a speed governor is provided which monitors propeller rotational speed and increases blade pitch whenever the speed becomes excessive. The increase pitch command from the speed governor locks out any other blade pitch commands dispatched from other engine control subsystems. This lockout requires separate blade pitch control hardware in order to ensure proper operation.

DISCLOSURE OF INVENTION

Objects of the invention include reliable, cost effective aircraft engine propeller overspeed protection.

According to the present invention, an aircraft engine autofeathering system utilizes common hardware to detect both aircraft engine power loss and aircraft engine propeller overspeed.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

Figure 1:
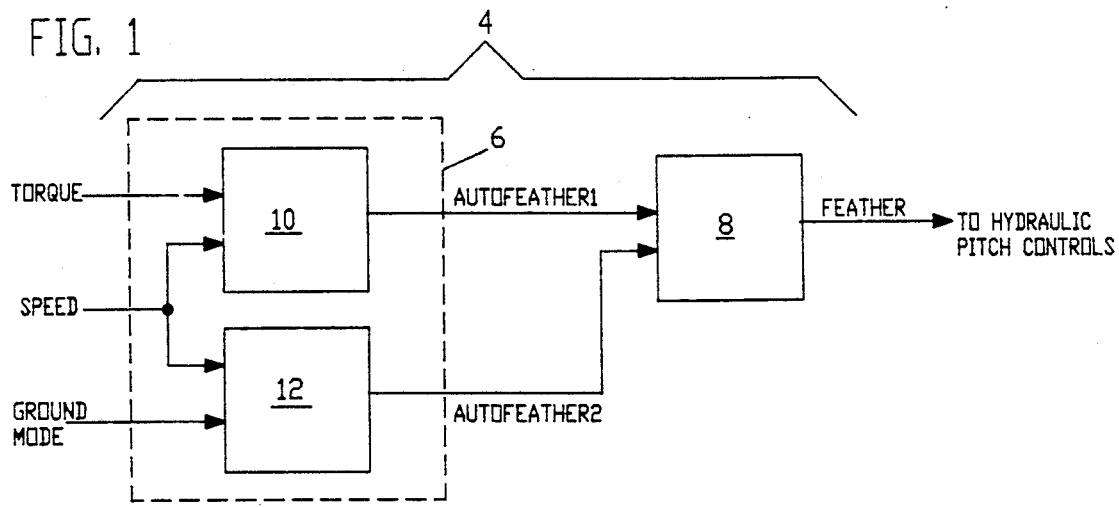
FIG. 1 is a schematic block diagram of an aircraft engine propeller autofeather system according to the invention.

Referring to FIG. 1, an aircraft engine propeller autofeather system 4 is comprised of a microprocessor system 6 and a feather solenoid 8. Three digital inputs to the microprocessor system 6 are TORQUE, SPEED, and GROUND MODE. The TORQUE signal is indicative of the torque generated by the aircraft engine. The SPEED signal is indicative of the speed of rotation of the aircraft engine propeller. The GROUND MODE signal is a single bit signal indicative of the flight status of the aircraft which is equal to a particular digital state if the aircraft is on the ground, taking off, or landing and which is equal to the opposite digital state all other times. The SPEED, TORQUE, and GROUND MODE signals are provided by sensors (not shown) which are external to the aircraft engine propeller autofeather system 4. The design and implementation of the sensors is known to those skilled in the art. The microprocessor system 6 asserts two single bit, digital signals: AUTOFEATHER1 and AUTOFEATHER2, which excite a first and second coil (not shown) of the feather solenoid 8, respectively Excitation of either the first coil or the second coil causes the feather solenoid 8 to actuate hydraulic pitch controls (not shown) which feather (i.e. increase the pitch) aircraft engine propeller blades (not shown). Therefore, assertion of the AUTOFEATHER1 signal will cause the propeller blades to feather irrespective of the state of the AUTOFEATHER2 signal. Similarly, assertion of the AUTOFEATHER2 signal will cause the propeller blades to feather irrespective of the state of the AUTOFEATHER1 signal.

Figure 2:
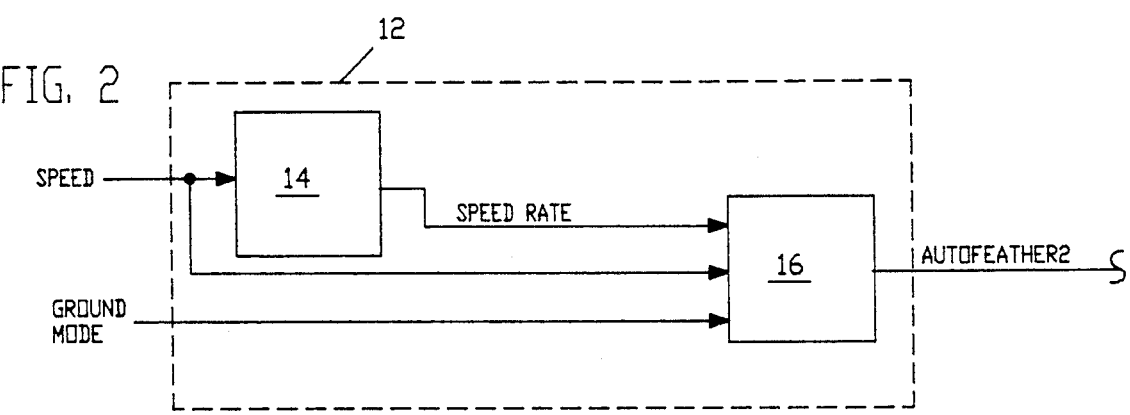
FIG. 2 is a schematic block diagram of an aircraft engine propeller overspeed detector according to the invention.

The microprocessor system 6 has a microprocessor (not shown), ROM (not shown), RAM (not shown), and interface circuitry (not shown) which are interconnected and deployed in a fashion known to those skilled in the art. FIG. 1 illustrates that software of the microprocessor system 6 is comprised of a power loss detector 10 and an overspeed detector 12. The power loss detector 10 is solely responsible for asserting the AUTOFEATHER1 signal (whenever aircraft engine power, which is proportional to the product of engine torque and engine speed, falls below a predetermined value) while the overspeed detector 12 is solely responsible for asserting the AUTOFEATHER2 signal. Referring to FIG. 2, the overspeed detector 12 is comprised of a speed rate calculator 14 and an overspeed controller 16. The speed rate calculator 14 has a single input, the SPEED signal, and a single output, a SPEED RATE signal, which is a digital value indicative of the rate of change of the value indicated by the SPEED signal. The speed rate calculator 14 calculates the speed rate by periodically sampling the SPEED signal, subtracting the value indicated by the previously sampled SPEED signal from the value indicated by the currently sampled SPEED signal, and dividing the difference by the sampling period. The SPEED RATE signal indicates a value of zero when the rotational speed of the aircraft engine propeller is constant. The SPEED RATE signal indicates a positive value when the rotational speed of the propeller is increasing and a negative value when the rotational speed of the propeller is decreasing.

Figure 3:
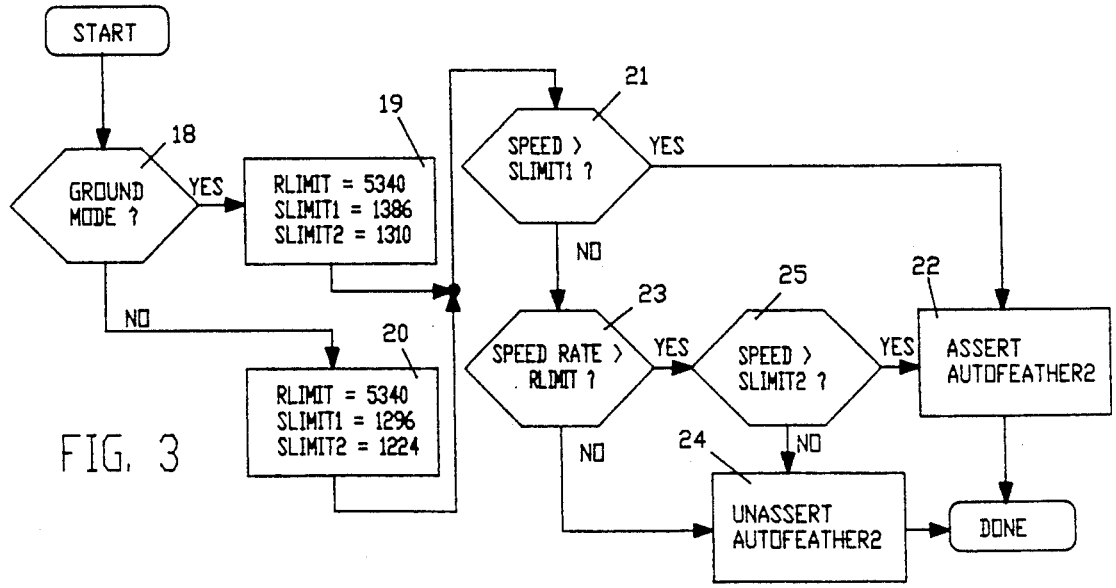
FIG. 3 is a flow chart of the control logic for an aircraft engine overspeed controller according to the invention.

FIG. 3 illustrates control logic for the overspeed controller 16. Initially, the state of the GROUND MODE signal is tested at a step 18. If the GROUND MODE signal indicates that the aircraft is on the ground, taking off, or landing, control passes to a step 19. Otherwise, control passes to a step 20. Values for three variables, RLIMIT, SLIMIT1, and SLIMIT2 (the nature and purpose of which will become more apparent in the forthcoming discussion) are determined at the steps 19, 20.

Note that for both of the steps 19, 20, the variable RLIMIT is set to 5340, but that SLIMIT1 and SLIMIT2 are set to 1386 and 1310, respectively, at the step 19 while SLIMIT1 and SLIMIT2 are set to 1296 and 1224, respectively, at the step 20. The particular numbers which are used at the steps 19, 20 are for the model PW 118 aircraft engine.

The value of the SPEED signal is compared to value of the variable SLIMIT1 at a step 21. The value of the variable SLIMIT1 is the maximum allowable rotational speed for safe operation of the propeller. Therefore, if the rotational speed of the propeller exceeds the value of SLIMIT1, control is passed to a step 22 where the AUTOFEATHER2 signal is asserted (thereby feathering the propeller blades and hence causing a decrease of propeller speed).

Two possible values for the variable SLIMIT1 exist (i.e. 1386 if the step 19 is executed or 1296 if the step 20 is executed) because the propeller can experience a momentary surge of rotational speed on the ground if the propeller blades are toggled between the forward thrust position and reverse thrust position. The higher limit is permissible because the surge of rotational speed is very brief. Furthermore, toggling the propeller blades between the forward thrust position and the reverse thrust position is not allowed while the aircraft is in flight. If at the test at the step 21 the value indicated by the SPEED signal is less than the value of the SLIMIT1 variable, control passes to a step 23, where the value indicated by the SPEED RATE signal is compared to the value of RLIMIT variable. The value of the RLIMIT variable is the threshold limit for the rate of rotational speed increase which can trigger an overspeed condition Therefore, if the value indicated by the SPEED RATE signal is less than or equal to (i.e. is not greater than) the value of the RLIMIT variable, control passes to a step 24 where the AUTOFEATHER2 signal is unasserted.

If, on the other hand, the value indicated by the SPEED RATE signal is greater than the value of the RLIMIT variable, control passes to a step 25 where the value indicated by the SPEED signal is compared to the value of the SLIMIT2 variable Note that, just as with the SLIMIT1 variable, the SLIMIT2 variable has two possible values (i.e. 1310 if the step 19 is executed and 1224 if the step 20 is executed) which exist in order to allow for the momentary surge of rotational speed which occurs when the aircraft is on the ground and the propeller blades are toggled between the forward thrust and the reverse thrust positions. If the value indicated by the SPEED signal is greater than the value of the SLIMIT2 variable, control passes to the step 22 where the AUTOFEATHER2 signal is asserted. Otherwise, control passes to the step 24 where the AUTOFEATHER2 signal is unasserted.

Although the power loss detector 10 and the overspeed detector 12 are shown as software within a microprocessor system 6, the invention may, instead, be implemented solely by hardware, which would be straight forward in view of the hardware/software equivalence discussed (in another field) in U.S. Pat. No. 4,294,162 entitled "Force Feel Actuator Fault Detection with Directional Threshold" (Fowler et al.). Furthermore, if the invention were implemented solely by hardware, then the TORQUE, SPEED, and GROUND MODE signals could be implemented as analog signals instead of digital signals. The values illustrated for the variables RLIMIT, SLIMIT1, and SLIMIT2 can be changed for aircraft engines having different rotational tolerances. In fact, the overspeed detector 12 will work if RLIMIT is set to a very high value, which would effectively eliminate the test steps 23, 25. The method for calculating of the value of the SPEED RATE signal can be modified to include techniques known to those skilled in the art for eliminating spurious measurements, such as averaging or histograming.

Even though the invention illustrates the use of a solenoid 8 for actuating hydraulic pitch controls, the invention may be practiced using alternative means, known to those skilled in the art, for actuating pitch controls.

Although the invention has been shown and described with respect to exemplary embodiments thereof, it should be understood by those skilled in the art that various changes, omissions and additions may be made therein and thereto, without departing from the spirit and the scope of the invention.

I claim:

1. An aircraft engine propeller autofeather system, comprising:
    signal means, for providing a torque signal indicative of engine torque, for providing a speed signal indicative of engine rotational speed, and for providing a ground mode signal indicative of aircraft flight status; and
    processing means, for providing a first autofeather signal in response to said speed and torque signals indicating engine power loss, and for providing a second autofeather signal in response to said speed and ground mode signals indicating a propeller overspeed condition.

2. An aircraft engine propeller autofeather system, according to claim 1, further comprising:
    actuation means for actuating blade pitch controls in response to said first autofeather signal or to said second autofeather signal.

3. An aircraft engine propeller autofeather system, according to claim 2, wherein said torque, speed, and ground mode signals are digital signals.

4. An aircraft engine propeller autofeather system, according to claim 3, wherein said processing means is a microprocessor system.

5. An aircraft engine propeller autofeather system, according to claim 4, wherein said actuation means is a feather solenoid.

* * * * *

UNITED STATES PATENT AND TRADEMARK OFFICE
CERTIFICATE OF CORRECTION

PATENT NO. : 5,019,006

DATED : May 28, 1991

INVENTOR(S) : Roy W. Schneider and Christopher D. Sierra

It is certified that error appears in the above-identified patent and that said Letters Patent is hereby corrected as shown below:

ON THE TITLE PAGE:
In the title, please cancel "Technical Field".

Signed and Sealed this

Fifteenth Day of December, 1992

Attest:

DOUGLAS B. COMER

*Attesting Officer*  *Acting Commissioner of Patents and Trademarks*